Dec. 21, 1954   E. A. HOLMES III   2,697,797
CATHODE-RAY TUBE INDICATOR DEFLECTION CIRCUIT
Filed April 24, 1946   2 Sheets-Sheet 1

INVENTOR
EUGENE A. HOLMES III
BY
ATTORNEY

Dec. 21, 1954   E. A. HOLMES III   2,697,797
CATHODE-RAY TUBE INDICATOR DEFLECTION CIRCUIT
Filed April 24, 1946   2 Sheets-Sheet 2

INVENTOR
EUGENE A. HOLMES III
BY
ATTORNEY

United States Patent Office 2,697,797
Patented Dec. 21, 1954

2,697,797

CATHODE-RAY TUBE INDICATOR DEFLECTION CIRCUIT

Eugene A. Holmes III, Boston, Mass., assignor, by mesne assignments, to the United States of America as represented by the Secretary of the Navy Application April 24, 1946, Serial No. 664,461

5 Claims. (Cl. 315—24)

This invention relates to a precision type plan position indicator (PPI) and more specifically to means for calibrating the azimuth sweep of an indicator which presents a plot of range against azimuth (B type) used in such a precision PPI.

Certain radar applications require the determination of accurate range and azimuth data over wide ranges. This is difficult to obtain using a single indicator to cover a large area. A system employing a secondary indicator to show a small selected area of the large indicator on an expanded scale will permit greater accuracy in reading the range and bearing of any selected target. A precision plan position indicator (hereinafter abbreviated P³I) employing a PPI indicator and a B indicator to present an expanded view of any selected portion of the PPI serves the above purpose of providing greater range and azimuth accuracy.

In such a system the B indicator presents the information of a small sector on the PPI, for example, a sector 2 miles wide and covering 60° in azimuth. Controls are provided to vary the sector of the PPI which is shown on the B indicator. The B indicator is calibrated so that it accurately covers the selected area of the PPI. The range of the B indicator can be calibrated by usual means. When calibrating the azimuth sweep the normal procedure is to stop the antenna of the radar at various positions and set the B indicator to correspond over its azimuth range. This introduces confusion and difficulty when having to stop the antenna or azimuth drive mechanism.

It is therefore an object of this invention to provide means for calibrating a remote B indicator without interrupting the antenna scanning operation.

Another object of this invention is to provide a means of calibrating a remote B indicator using only a simple switch arrangement which will only disable the B indicator during calibration.

These and other objects will be apparent from the following specification when taken with the accompanying drawing in which.

Before proceeding with a detailed description of the features of the invention, the P³I with which it is used will be described to better illustrate the invention itself.

The P³I is a separate unit employing a PPI and a B indicator to present accurate data from the radar system with which it is employed. The radar supplies a trigger pulse and video data to the P³I. A range control is provided to select the range which the B indicator will cover. A counter geared to this control indicates the accurate range to the target selected on the B indicator. An azimuth crank is provided to set the azimuth cursor of the PPI on a selected target. This acts in such a way that the B indicator is swept in azimuth either side of the selected bearing so that the selected target will appear at the center of the B indicator. The azimuth crank also has an indicator geared to it which indicates the bearing to the selected target. However the range indicator reads range to the center of the B indicator and the azimuth indicator reads the bearing to the horizontal center of the B indicator. Thus in order to obtain the accurate range and bearing to a selected target it must appear at the center of the B indicator. If the selected target does not appear at the center of the B indicator, the indicated data will not be correct. Means are provided to correct this during the period when the B indicator is not being swept in azimuth. A range spot is generated and applied to the B indicator. A range correction potentiometer is connected to the range crank during this time. An azimuth correction potentiometer is connected to the azimuth crank during this same period. By moving both controls to move the spot until it corresponds to the position of the target (which will remain due to screen persistence) the range will be corrected and the azimuth position of the sweep will be corrected so that on the next sweep of the B indicator cathode ray tube, the target will appear at the center and the range and azimuth indicators will be correct.

Figure 1:
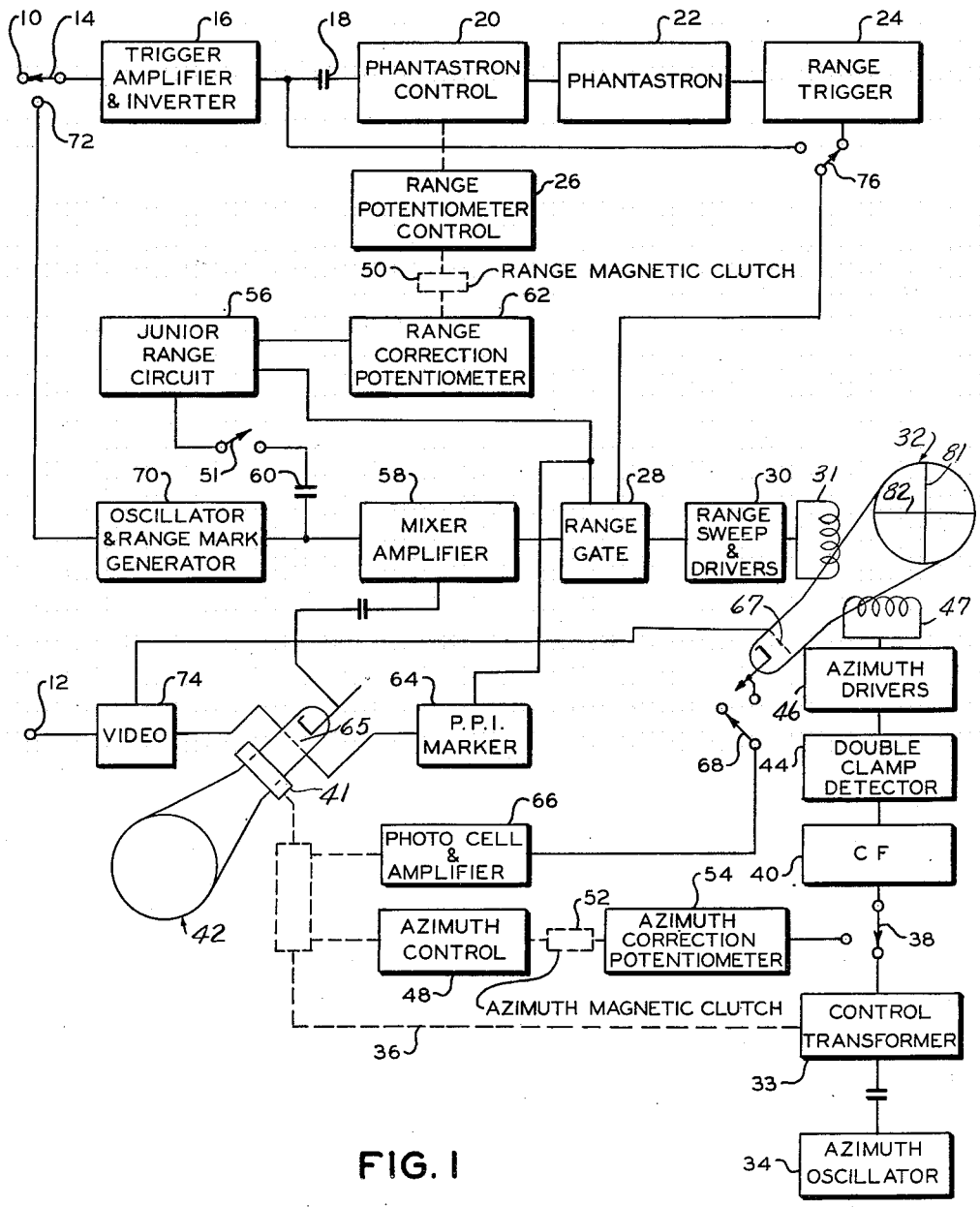
Fig. 1 is a block diagram of the complete system.

Now referring to Fig. 1, which shows most of the components of the P³I in block form, a trigger pulse is applied at terminal 10 and radar video data is applied at terminal 12. The trigger at terminal 10 is applied, through selector switch 14 to the trigger amplifier and inverter 16. Trigger amplifier 16 applies a trigger, at the time of the input trigger, through capacitor 18 to the phantastron control circuit 20. When control circuit 20 receives this trigger pulse it causes phantastron 22 to operate.

The term phantastron is used to denote a special accurate gating circuit using a multigrid tube, two of which grids control the time it operates when fired by an external trigger. The length of delay produced by phantastron 22 is varied by control circuit 20. The amount of delay is set by range potentiometer control 26 which sets a special potentiometer (not shown) in control circuit 20. When the phantastron cuts off again range trigger 24 operates and puts out a pulse to range gate 28 which causes it to operate. When range gate 28 operates it starts the range sweep and driver circuit 30 which applies a sweep to the vertical deflection coils 31 of the B indicator 32 starting at a range determined by the setting of range potentiometer control 26. Range gate 28 also controls the length of the sweep of B indicator 32, for the present example 4,000 yards.

Figure 2:
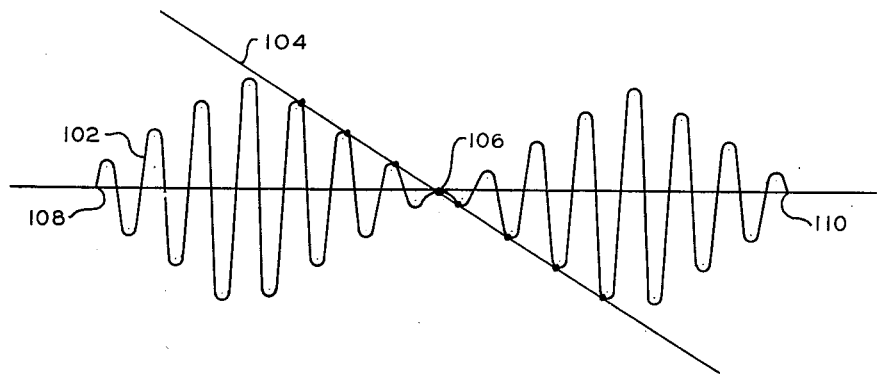
Fig. 2 shows the waveform and sweep voltage developed in one part of the circuit and, Fig. 3 is a diagram showing one form of the invention.

The azimuth or horizontal sweep on the B indicator is derived from a synchro control transformer 33 and an associated electronic circuit. Azimuth oscillator 34 feeds oscillations of a relatively high frequency into the rotor of control transformer 33. The rotor is driven through suitable linkage 36 at the same rotational speed as the rotating sweep coil 41 of the PPI 42. The output from the stator of control trasnformer 33 will comprise the oscillations from azimuth oscillator 34 amplitude-modulated sinusoidally at a frequency determined by the rotor speed and thus the rotational sped of PPI 42 as illustrated in Fig. 2 by waveform 102. The amplitude modulated wave 102, Fig. 2, is applied through switch 38 to the cathode follower 40 which in turn applies the signal to the double clamp detector circuit 44 which detects this amplitude modulated wave. Double clamp detector circuit 44 may be any type of detector circuit that is capable of providing an output that faithfully represents both the positive and negative cycles of a modulation envelope. A circuit well suited for this purpose is the double triode detector circuit described in United States Patent 2,389,692 issued to C. W. Sherwin. It should be remembered that in the actual case many more oscillations than shown occur to give greater accuracy. The output from double clamp 44 will be the envelope of the applied wave. In the area shown by line 104 of Fig. 2 on either side of the null point 106 this envelope will be quite linear as shown by line 104. The output from double clamp circuit 44 is applied to the azimuth sweep and driver circuit 46. The output of circuit 46 is applied to the horizontal deflection coils 47 of indicator 32. A linear portion of this envelope, thirty degrees either side of null point 106 for the present example is used to drive the azimuth circuit and thus the azimuth sweep of the B indicator 32. When azimuth control 48 is varied it varies the cursor (not shown) on the PPI and at the same time varies the mechanical phase of the control transformer 33. Varying the mechanical phase of control transformer 33 shifts the null point 106, Fig. 2, and thus varies the sector of the PPI 42 which the B indicator 32 covers in its azimuth sweep. Thus it may be seen that by using range potentiometer control 26 and azimuth control 48 any 2 mile sector 60° in azimuth may be selected and presented on the B indicator 32 at an expanded scale so that range and bearing of a target in the sector may be accurately determined.

As stated above the range potentiometer control and the azimuth control read range and azimuth data at the center of the B indicator 32. Thus range and bearing of a target off center on the B indicator 32 cannot be determined accurately. Range and azimuth correction circuits are provided to permit corrections during the time the B indicator 32 is not sweeping in azimuth. Just after the B indicator 32 finishes an azimuth sweep cam operated relays, not shown, are energized to close the range magnetic clutch 50, azimuth magnetic clutch 52, switch 51 operates to connect the junior range circuit 56 to mixer amplifier 58 through capacitor 60, and switch 38 operates to connect the azimuth correction potentiometer 54 to the cathode follower 40. During this period, the time it takes the PPI 42 to sweep the other 300° in azimuth, there will not be any targets or sweep applied to the B indicator 32 but the targets on these will remain visible due to screen persistence.

Junior range circuit 56 will receive a trigger pulse from range gate 28 and from this will generate a pulse which is applied through switch 51 to mixer amplifier 58 and thence to the B indicator 32 as a spot. The range of this spot is variable by means of range correction potentiometer 62. Since range potentiometer control 26 is connected to range correction potentiometer 62 it is now used to vary the range of the spot on the B indicator 32 until it corresponds in range with the target. In similar fashion azimuth correction potentiometer 54 provides a voltage which is applied through switch 38 to cathode follower 40 and thence through double clamp 44 to azimuth drivers 46 to set the azimuth position of the spot on the B indicator 32. Azimuth control 48 is now coupled through azimuth magnetic clutch 52 to azimuth correction potentiometer 54. As azimuth control 48 is changed the output voltage from azimuth correction potentiometer is changed also and thus the spot on B indicator 32 is moved in azimuth. The spot on the B indicator 32 is now placed to correspond in azimuth with the target azimuth.

Range potentiometer control 26, in setting the spot on the B indicator, changes the delay of phantastron control circuit 20. In like manner azimuth control 48 will also change the control transformer 33 while setting the azimuth on the spot on the B indicator. The change made in the phantastron control 20 is proportional to the range error on the B indicator and the change made in the control transformer 33 is proportional to the azimuth error. Now just before the regular azimuth sweep starts again the cams operate the relays mentioned above to return the circuit to normal for the B indicator azimuth sweep. The changes made in the phantastron control 20 and control transformer 33 cause the target to appear at the center of the B indicator 32 and the range and azimuth indicators will give accurate range and bearing information. In addition the range correction potentiometer 62 and azimuth correction potentiometer 54 are returned to their neutral positions to be ready for use the next correction cycle.

The sector being received on the B indicator 32 is indicated on the PPI 42 by an intensified sector. The intensifying pulse is developed in the PPI marker circuit 64. Range gate 28 supplies a gate equal in length to the B indicator range sweep to the PPI marker 64. This causes the PPI marker 64 to operate and supply intensifying pulses to the grid 65 of PPI 42 during the period the B indicator is sweeping so the sector being scanned by the B indicator 32 is shown intensified on PPI 42.

Azimuth marks are produced on B indicator 32 by photo cell amplifier 66. A slotted grid is rotated by the azimuth drive of the PPI 42 about a light source (not shown). At given intervals a slot passes between the light and a photo cell causing it to operate and produce an azimuth trace on B indicator 32 whenever switch 68 is closed. Thus since the slotted grid is driven from the PPI azimuth drive mechanism the azimuth traces produced on B indicator 32 will occur at specified bearings of the PPI 42.

Oscillator and range mark generator 70 operates at a frequency to produce a 2,000 yard range interval and a 10,000 yard range interval. During normal operation of the equipment, the B+ supply is removed from oscillator and range mark generator 70 and there is no output from the circuit. However, when switch 14 is changed over to terminal 72 the B+ supply will be connected to oscillator and range mark generator 70. Now normal operation will be disabled and range marks will be generated and applied to B indicator 32 through contact 72 and to the PPI from mixer amplifier 58.

Video data is applied at terminal 12 to the video amplifier 74 which amplifies the video signals and applies them to the grid 65 of PPI 42 and grid 67 of B indicator 32.

As has been explained the range and azimuth indicators read range and bearing to the center of the indicator which means that the minimum accurate range that can be determined is 2,000 yards. In order to provide for ranges less than that switch 76 is provided to switch from the range trigger circuit 24 and apply trigger pulses from trigger amplifier 16 directly to the range gate 28. Then the junior range circuit 56 can be used as described above to read the range of a target within 2,000 yards. When operating in this manner the range correction potentiometer is not returned to its neutral position each time the B indicator sweeps in azimuth.

It has been necessary to stop the antenna or disconnect the azimuth drive mechanism to calibrate the B indicator in azimuth. This troublesome procedure is eliminated by this invention, which permits calibration of the B indicator without interrupting the operation of the system.

Figure 3:
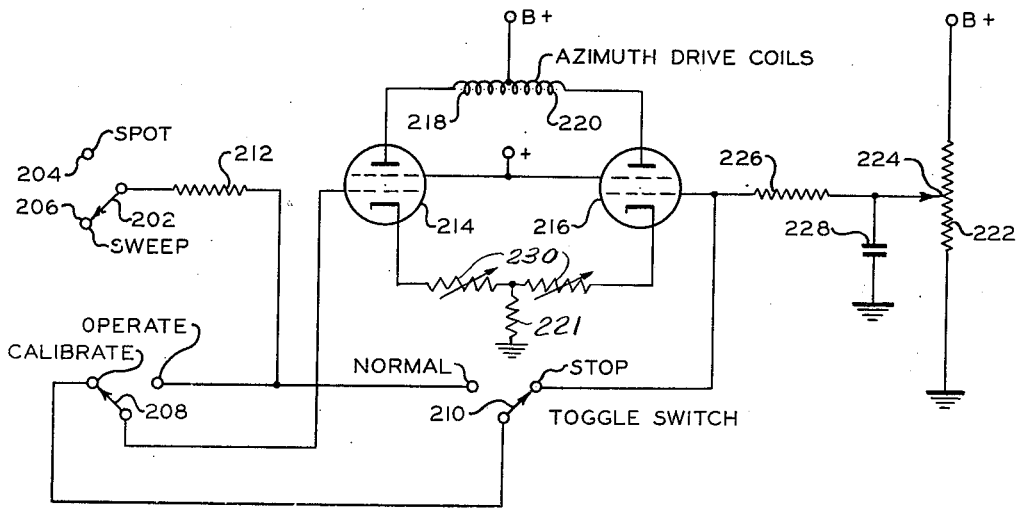

Referring now to Fig. 3, the azimuth driver circuit 46, Fig. 1 will now be described with the features of the invention. Switch 202 is used to indicate the two types of inputs which may be applied to the circuit. Switch 38, Fig. 1, serves the same purpose in the circuit described. A steady D. C. voltage is applied at terminal 204 such as is obtained from azimuth correction potentiometer 54, Fig. 1. A sweep voltage is applied at terminal 206 such as is obtained from control transformer 32, Fig. 1, and shown in Fig. 2 by voltage wave 104. As described above the sweep voltage 104 is developed from wave 102. The null point 106 may be varied between the limits 108 and 110 by the cursor of the PPI as it is moved around the indicator to select the bearing of the target to be presented on the B indicator. This null point 106 then centers the B indicator about any bearing on the PPI. During normal operation switch 208 is in the operate position and switch 202 will be connected to contact 206. A sweep voltage will then be applied through resistance 212 and switch 208 to the grid of azimuth driver tube 214. Driver tube 216 obtains its grid voltage through resistance 226 from voltage divider 222 at contact 224. Capacitor 228 serves as a smoothing condenser. Driver tubes 214 and 216 will operate to provide push-pull output for driving the azimuth sweep of the B indicator by means of azimuth drive coils 218 and 220. The coupling between tubes 214 and 216 is provided by resistor 221 in the common cathode circuit. With toggle switch 210 in the normal position and switch 208 in the calibrate position, the circuit will still function in the same manner. When toggle switch 210 is in the stop position and switch 208 in the calibrate position the applied sweep voltage is removed from the tube 214 and the voltage on the grid of tube 216 is also applied to the grid of tube 214. This same voltage on both grids stops the sweep and places it at the center of the B indicator. If there is an unbalance in the current in the two tubes 214 and 216 the sweep will move off-center toward one side of the indicator. This may be compensated for by adjusting the variable resistance 230 in the cathode of tube 214 or 216 so that the current supplied by each tube is a given value, hence the sweep is returned to the center of the indicator. Since the center of the sweep is at a selected bearing on the PPI and the B indicator will thus sweep about any selected bearing on the PPI. This operation balances the output stage statically and provides a definite geometrical mean as defined by the range and azimuth, lines 81 and 82, respectively, to calibrate the moving azimuth sweep. Now, by returning the switches 208 and 210 to the calibrate-normal positions the movement of the sweep can be checked to see if it travels equally to either side of the center line of the indicator. A small error in displacement is corrected by adjusting the contact 224 on voltage divider 222. Large errors must be compensated for by varying contact 224 and the bias level of the input voltage applied to the grid of tube 214. When the indicator has been calibrated both statically and dynamically, the calibrate operate switch 208 is returned to the operate position for normal operation of the B indicator. The B indicator will now scan equal azimuth angles either side of any selected bearing on the PPI. Thus, it may be seen that this invention is of great advantage for calibrating remote B type indicators while the operation of the remainder of the system is not disturbed. It should also be noted that while the invention has been described as used in a P³I the idea may be applied to any moving push-pull sweep where the coil current is proportional to a single grid drive.

It is believed that the construction and operation, as well as the advantages of my improved calibration method will be apparent from the foregoing detailed description thereof. It will also be apparent that while I have shown and described my invention in a preferred form changes may be made in the circuits disclosed without departing from the spirit of the invention as sought to be defined in the following claims.

What is claimed is:

1. In a push pull type cathode ray tube indicator sweep circuit employing first and second driver tubes, a sweep voltage input to the grid of said first driver tube, means for applying a steady voltage to the grid of said second driver tube, switching means for removing said sweep voltage input from the grid of said first driver tube and applying said steady voltage to the grid of said first driver tube and to the grid of said second driver tube, means using a variable resistance to control the relative current flow between said driver tubes to center the sweep at a preselected line on the screen of the indicator, means employing said switching means for removing said steady voltage and reapplying said sweep voltage to the grid of said first driver tube, and means for varying the level of said steady voltage on the grid of said second driver tube to cause said sweep to travel equally either side of said preselected line on the screen of said indicator.

2. In a precision type plan position indicator employing a B type cathode ray tube indicator having two azimuth sweep driver tubes with push-pull output for producing an azimuth sweep, means for applying a sweep voltage varying about an adjustable reference angle to a first driver tube of said azimuth sweep drivers, means for applying a steady voltage to the grid of said second driver tube, switching means for removing said sweep voltage input from the grid of said first driver tube and applying said steady voltage from the grid of said second driver tube to said grid of said first driver tube, means for adjusting the relative current flow between said driver tubes to place the reference angle center of said applied sweep voltage at a preselected line on the screen of said B type indicator, means using said switching means for reapplying first sweep voltage to the grid of said first azimuth driver tube, means for varying the level of said steady voltage at the grid of said second azimuth driver tube for causing said azimuth sweep to travel equal azimuth angles about the reference angle position of said applied sweep.

3. In a cathode ray tube indicator normally responsive to a sweep voltage in which the deflection of the beam of said indicator extends from one extremity of the screen of said indicator to the opposite extremity of said screen, a deflection circuit incorporating means for centering the undeflected position of said beam on a preselected line on said screen and for equalizing the deflection of said beam on either side of said line, said deflection circuit comprising, first and second beam deflection coils arranged to deflect the electron beam of said indicator along a second line perpendicular to said preselected line, first and second electron tubes each having an anode, a cathode and a control grid, said first and second beam deflection coils being connected in the anode circuits of said first and second electron tubes respectively, a common cathode impedance, first and second individual cathode impedances coupling said common cathode impedance to the cathodes of said first and second electrons tubes respectively, at least one of said individual cathode impedances being adjustable, a source of adjustable bias potential normally coupled to said grid of said second electron tube, a source of sweep voltage, means normally coupling said sweep voltage source to the grid of said first electron tube, and means for disconnecting said sweep voltage source from said grid of said first electron tube and for connecting to said last-mentioned grid a potential equal to the bias potential on said grid of said second electron tube.

4. A push-pull deflection circuit for deflecting the beam of a cathode ray tube indicator from one extremity of said screen to another in response to an applied sweep voltage, said circuit incorporating means for centering the undeflected position of said beam on a preselected line on said screen and for equalizing the deflection of said beam on either side of said line, said deflection circuit comprising, first and second beam deflection coils arranged to deflect the electron beam of said indicator along a second line perpendicular to said preselected line, each of said deflection coils having one terminal thereof connected to a point of fixed reference potential, first and second electron tubes each having at least an anode, a cathode and a grid, the anodes of said first and second electron tubes being connected to second terminals of said first and second coils, respectively, a common cathode impedance, first and second means coupling said common cathode impedance to the cathodes of said first and second electron tubes, respectively, at least one of said last-mentioned means including an adjustable impedance, a source of adjustable bias potential normally coupled to said grid of said second electron tube, a source of sweep voltage, means normally coupling said sweep voltage source to the grid of said first electron tube, and means for disconnecting said sweep voltage source from said grid of said first electron tube and for connecting to said last-mentioned grid a potential equal to the bias potential on said grid of said second electron tube.

5. A cathode ray tube indicator deflection circuit comprising first and second deflection coils each having a terminal thereof returned to a point of fixed reference potential, first and second electron tubes each having at least an anode, a cathode and a control grid, the anodes of said first and second electron tubes being connected to second terminals of said first and second deflection coils, respectively, a common cathode impedance, first and second means coupling said common cathode impedance to said cathodes of said first and second electron tubes, respectively, at least one of said two last-mentioned means including an adjustable impedance, a source of adjustable bias potential coupled to said grid of said second electron tube, a source of sweep voltage, first and second two-position switch means each having a contact arm and first and second contact terminals, said contact arm of said first switch being connected to said grid of said first electron tube, said contact arm of said second switch being connected to said first contact terminal of said first switch, said second contact terminal of said second switch being connected to said grid of said second electron tube, said second contact terminal of said first switch and said first contact terminal of said second switch being connected to said source of sweep potential, said first and second switch means, said adjustable impedance and said adjustable bias source providing means for statically and dynamically balancing the sweep of said cathode ray indicator.

References Cited in the file of this patent

UNITED STATES PATENTS

| Number | Name | Date |
|---|---|---|
| 1,768,262 | Marrison | June 24, 1930 |
| 2,248,581 | Norgaard | July 8, 1941 |